G. A. CULVER.
CUTTING REEL FOR LAWN MOWERS.
APPLICATION FILED MAR. 11, 1909.
966,800.
Patented Aug. 9, 1910.
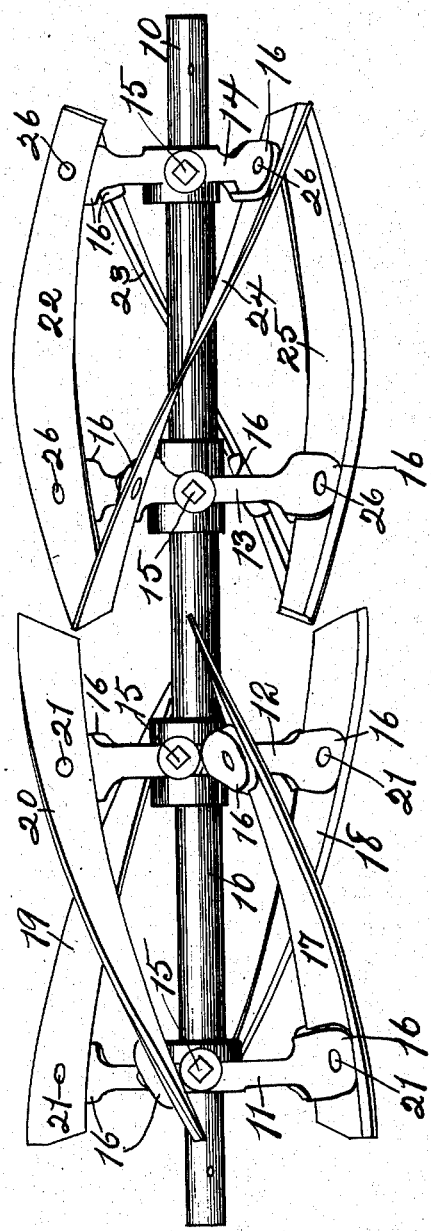
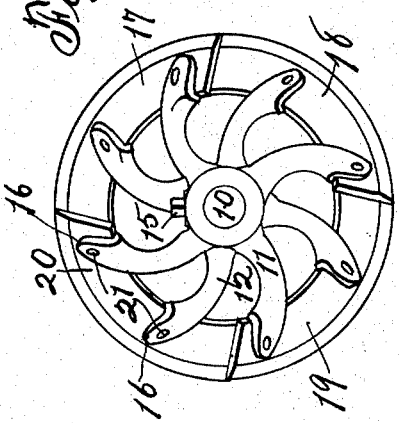

UNITED STATES PATENT OFFICE.

GEORGE A. CULVER, OF CLARINDA, IOWA.

CUTTING-REEL FOR LAWN-MOWERS.

966,800.  Specification of Letters Patent.  Patented Aug. 9, 1910.

Application filed March 11, 1909. Serial No. 483,291.

*To all whom it may concern:*

Be it known that I, GEORGE A. CULVER, a citizen of the United States of America, and resident of Clarinda, Page county, Iowa, have invented a new and useful Cutting-Reel for Lawn-Mowers, of which the following is a specification.

The object of this invention is to provide improved means for cutting grass.

A further object of this invention is to provide an improved construction for cutting reels of mowers.

A further object of this invention is to provide an improved arrangement of reel sections in a mower.

A further object of this invention is to provide an improved construction for blades or cutters of a mower reel.

My invention consists in the construction, arrangement and combination of elements hereinafter set forth, pointed out in my claims and illustrated by the accompanying drawing, in which—

Figure 1 is a plan of a complete reel. Fig. 2 is an end elevation of the same.

In the construction of the reel as shown the numeral 10 designates a shaft adapted to be mounted for rotation and rotated in any suitable manner. Spiders 11, 12, 13 and 14 are mounted on and adjustable longitudinally and circumferentially of the shaft 10. The spiders 11, 12, 13 and 14 are secured to the shaft 10 by set screws 15. Each spider comprises a hub and four arms integral with said hub. Each of the arms is curved relative to a radial line from the hub and is formed with a head 16 on its extremity, each head is relatively broad and flat and is rabbeted on one side. Each head 16 is twisted relative to the stem or arm on which it is formed. The spider 12 is set on the shaft 10 in such manner that its arms are in staggered relations to the arms of the spider 11 and helical blades 17, 18, 19 and 20 are seated in the rabbets of said arms and are secured rigidly to the head 16 by rivets 21. The helical blades are formed with beveled and sharpened cutting edges on their outer margins, and all points on said edges are equi-distant from the axis of the shaft 10. The helix of each blade 17, 18, 19 20 is such, in relation to its length and the orbit of the cutting edge thereof, that one end portion of each blade overlaps or intersects a right line on said orbit at the same time the opposite end of the adjacent blade intersects said right line. The heads 16 on the arms of the spiders 13, 14 are twisted opposite to the twisting of the heads 16 on the arms of the spiders 11, 12. The spider 13 is set on the shaft 10 in such manner that the arms thereof are in staggered relations to the arms of the spider 14. Cutting blades 22, 23, 24, 25, of form and size identical with the cutting blades 17, 18, 19 and 20, are mounted in the rabbets of the head 16 of the spiders 13, 14 and are secured thereto by rivets 26. The blades 22, 23, 24 and 25 are in the same relations to each other as are the blades 17, 18, 19 and 20 to each other. The blades 22, 23, 24 and 25 are in staggered relations to and at their inner ends overlap the inner end portions of the blades 17, 18, 19 and 20. Thus it will be observed that the pitch or helix of either blade 17, 18, 19 and 20 is arranged at an angle to the helix of either blade 22, 23, 24, 25.

In practical use the parts are assembled as shown, pairs of the spiders connected by four blades and the sets thus formed are adjusted on the shaft 10 in such manner that the inner ends of one set of blades overlap and are in staggered relations to the inner ends of the adjacent blades. Owing to the peculiar form of spiders and blades and the overlapping and staggering relations mentioned, and the angular arrangement of the blades of one set relative to the other, the grass is gathered and directed by both sets of blades toward the center of the shaft and is engaged by the cutting edges of the blades in a shearing manner. Thus one set of blades moves the grass in one direction toward the center and the other set of blades moves the grass in the opposite direction toward the center, and the side draft on one set of blades balances the side draft on the other set of blades and neutralizes or avoids end thrust on the shaft. Also in the rotation of the reel a blade engages the grass at one end before the other end of the preceding blade ceases to cut.

I claim as my invention—

1. A cutting reel for mowers, comprising a shaft, spiders mounted on and adjustable longitudinally and circumferentially of said shaft and relative to each other, two sets of helical cutting blades of four blades each carried by said spiders, the blades of one set arranged angularly relative to the blades of the other set, the inner ends of the blades overlapping and trailing, relative to the outer ends of said blades, in the orbit of the cutting edges thereof, whereby one set of blades is adapted to move the grass in one direction toward the center and the other set of blades is adapted to move the grass in the other direction toward the center, and the side draft on one set of blades balances the side draft on the other set of blades and neutralizes or avoids end thrust on the shaft, the helix of each blade being such that one end thereof and the opposite end of the adjacent blade of the same set coincidently intersect a right line on the orbit of the reel.

2. A cutting reel for mowers, comprising a shaft, two pairs of spiders mounted on and adjustable longitudinally and circumferentially of said shaft, cutting blades of helical form mounted on one pair of the spiders and cutting blades of helical form mounted on the other pair of spiders, the blades on one pair of spiders arranged angularly relative to the blades on the other pair of spiders, the inner ends of the blades on one pair of spiders overlapping and in staggered relations to the inner ends of the blades on the other pair of spiders, the helix of each blade being such that one end thereof and the opposite end of the adjacent blade of the same set coincidently intersect a right line on the orbit of the reel.

3. A cutting reel for mowers, comprising a shaft, two sets of cutting blades carried by said shaft and overlapping at their inner ends, said sets of blades arranged for circumferential and longitudinal adjustment relative to each other on said shaft, the blades of one set arranged angularly relative to the blades of the other set, the overlapping inner ends of the blades trailing, relative to the outer ends of said blades, in the orbit of the cutting edges thereof, whereby one set of blades is adapted to move the grass in one direction toward the center and the other set of blades is adapted to move the grass in the opposite direction toward the center, and the side draft on one set of blades balances the side draft on the other set of blades and neutralizes or avoids end thrust on the shaft.

4. A cutting reel for mowers, comprising a shaft, two sets of cutting blades of four blades each carried by said shaft and overlapping at their inner ends, the blades of one set arranged angularly relative to the blades of the other set, the overlapping inner ends of the blades trailing, relative to the outer ends of said blades, in the orbit of the cutting edges thereof, whereby one set of blades is adapted to move the grass in one direction toward the center and the other set of blades is adapted to move the grass in the opposite direction toward the center, and the side draft on one set of blades balances the side draft on the other set of blades and neutralizes or avoids end thrust on the shaft, the helix of each blade being such that one end thereof and the opposite end of the adjacent blade of the same set coincidently intersect a right line on the orbit of the reel.

Signed by me at Des Moines, Iowa, this twenty third day of December, 1908.

GEORGE A. CULVER.

Witnesses:
THOMAS G. ORWIG,
EARL M. SINCLAIR.